(12) United States Patent
Liu et al.

(10) Patent No.: US 7,894,944 B2
(45) Date of Patent: Feb. 22, 2011

(54) ENVIRONMENTAL MONITORING IN DATA FACILITIES

(75) Inventors: Jie Liu, Sammamish, WA (US); Feng Zhao, Issaquah, WA (US); Nissanka Bodhi Priyantha, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 246 days.

(21) Appl. No.: 11/841,658

(22) Filed: Aug. 20, 2007

(65) Prior Publication Data

US 2009/0012633 A1 Jan. 8, 2009

Related U.S. Application Data

(60) Provisional application No. 60/948,416, filed on Jul. 6, 2007.

(51) Int. Cl.
*G05B 19/18* (2006.01)
*G05B 11/01* (2006.01)
*G05B 13/00* (2006.01)
*G06F 11/00* (2006.01)

(52) U.S. Cl. ............... 700/276; 700/3; 700/17; 702/182; 702/188; 715/961

(58) Field of Classification Search ............... 700/2, 700/3, 9–12, 14–17, 19, 22, 28–31, 49, 50, 700/275–278, 291, 295, 299, 300; 702/132, 702/182–184, 188; 709/223–226; 361/688; 715/700, 738–740, 771, 772, 961, 965
See application file for complete search history.

(56) References Cited

U.S. PATENT DOCUMENTS

| | | |
|---|---|---|
| 4,823,290 A | 4/1989 | Fasack et al. |
| 6,798,341 B1 | 9/2004 | Eckel et al. |
| 7,006,949 B2 | 2/2006 | Moore |
| 7,144,152 B2 | 12/2006 | Rusu et al. |
| 7,378,962 B2 * | 5/2008 | Odenwald et al. ...... 340/539.22 |

(Continued)

FOREIGN PATENT DOCUMENTS

EP 1762924 A1 3/2007

(Continued)

OTHER PUBLICATIONS

Bajcsy, et al., "A New Thermal Infrared Camera Calibration Approach Using Wireless MEMS Sensors", available at least as early as Jun. 6, 2007, at <<http://isda.ncsa.uiuc.edu/peter/publications/conferences/2004/PB-20040119-1.pdf>>, pp. 6.

(Continued)

*Primary Examiner*—Sean P Shechtman
(74) *Attorney, Agent, or Firm*—Lee & Hayes, PLLC

(57) ABSTRACT

Processes and techniques for environmental monitoring in a data facility are described. A network of environmental sensors is arranged to monitor a variety of environmental conditions of the facility. The sensors can be queried to generate data describing specific environmental conditions, and the data can be processed to generate an environmental image of all or part of the data facility. The environmental image can optionally be viewed by data facility personnel and can be used to manipulate one or more environmental conditions of the data facility.

16 Claims, 7 Drawing Sheets

U.S. PATENT DOCUMENTS

| | | | |
|---|---|---|---|
| 7,493,193 B2* | 2/2009 | Hyland et al. | 700/275 |
| 2002/0174223 A1* | 11/2002 | Childers et al. | 709/224 |
| 2004/0260967 A1 | 12/2004 | Guha et al. | |
| 2005/0283624 A1* | 12/2005 | Kumar et al. | 713/300 |
| 2006/0155517 A1 | 7/2006 | Dobbs et al. | |
| 2006/0168975 A1* | 8/2006 | Malone et al. | 62/180 |
| 2007/0067136 A1 | 3/2007 | Conroy et al. | |
| 2007/0101173 A1 | 5/2007 | Fung | |
| 2008/0300818 A1* | 12/2008 | Brey et al. | 702/130 |

FOREIGN PATENT DOCUMENTS

| | | |
|---|---|---|
| KR | 0285995 Y1 | 8/2002 |
| KR | 20060058409 A | 5/2006 |

OTHER PUBLICATIONS

"Clearance: Server Environment Monitoring System", retrieved on Jun. 7, 2007, at <<http://www.networktechinc.com/enviro-rems1.html>>, pp. 2.

Moore, et al., "Data Center Workload Monitoring, Analysis, and Emulation", available at least as early as Jun. 6, 2007, at <<http://www.cs.duke.edu/~justin/papers/caecw05data.pdf>>, pp. 8.

Akyildiz, et al, "A Survey on Sensor Networks", IEEE Communications Magazine, Aug. 2002, pp. 102-114.

Akyildiz, et al., "Wireless Sensor Networks: A Survey", Computer Networks: The International Journal of Computer and Telecommunications Networking, Mar. 15, 2002, vol. 38, No. 4, pp. 393-422.

* cited by examiner

| Sensor Data Table 702 | | | | | |
|---|---|---|---|---|---|
| Sensor Record | Sensor ID | Sensor Type | Sensor Location | Sensor Value | Sample Time |
| 1 | 12345 | Temperature | R2-C1-S40-F | 99.3°F | 09:22:17 |
| 2 | 54321 | Temp/Humidity | R12-C8-S3-F | 46.3% | 13:04:54 |
| 3 | A324B3E5 | Air Flow | RM4-CrSE | 250 CFM | 14:15:01 |
| 4 | 8H435I | Power | R3-C4 | 11.4KW | 18:21:41 |
| ...N | ...N | ...N | ...N | ...N | ...N |

FIG. 7

ENVIRONMENTAL MONITORING IN DATA FACILITIES

RELATED APPLICATIONS

The present application claims priority under 35 U.S.C. §119(e) to U.S. Provisional Application No. 60/948,416 filed Jul. 6, 2007, the disclosure of which is incorporated herein.

BACKGROUND

To manage today's tremendous data handling requirements, most enterprises employ some form of a data facility. Typical data facilities house data storage and processing equipment that can perform a variety of data storage and computational tasks. Data facilities may also host web servers, Internet services, and other enterprise-based services. While maintaining a data facility enables an enterprise to manage large quantities of data, the energy costs associated with running a data facility present a significant expenditure. A large percentage of data facility energy costs arise from the environmental controls required to ensure that the environment within the data facility is maintained within suitable parameters for the equipment contained in the facility. Examples of the environmental controls include cooling, air flow, humidity controls, power regulators, and so on. All of these controls work together to attempt to create an environment in which the data facility equipment can operate at maximum efficiency and thus decrease the overall energy costs of the data facility.

Problems can arise in a data facility when environmental conditions fail to remain within acceptable operating parameters. Hot spots can cause equipment to run at less than optimal efficiency and at extremes can result in equipment failure and service interruptions. Excess humidity can allow condensation to form in and around data facility equipment and result in data processing and storage errors and ultimately, equipment failure. To control environmental conditions such as temperature and humidity, a data facility administrator needs to be aware of both global and local environmental conditions within the facility.

To enable data facility designers and administrators to determine optimal placement and settings for environmental controls, some form of environmental monitoring is desirable. Most current forms of environmental monitoring are difficult to implement and tend to create an incomplete and inaccurate image of data facility environmental conditions.

SUMMARY

This summary is provided to introduce techniques and processes for environmental monitoring in data facilities, which are further described below in the Detailed Description. This summary is not intended to identify essential features of the claimed subject matter, nor is it intended for use in determining the scope of the claimed subject matter.

This disclosure is directed to processes and techniques for environmental monitoring in a data facility. A network of sensors is arranged to monitor a variety of environmental conditions of the facility. The sensors can be queried to generate data describing specific environmental conditions, and the data can be processed to generate an environmental image of all or part of the data facility. The environmental image can optionally be viewed by data facility personnel and can be used to manipulate one or more environmental conditions of the data facility.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

FIG. 7 illustrates one example of a sensor data table that tracks sensor data in a sensor network.

DETAILED DESCRIPTION

Described herein are processes and techniques for environmental monitoring and control in data facilities. A data facility can include any facility and/or group of facilities, such as a data center or centers, that houses data storage and processing devices (e.g., web servers). A typical data facility requires carefully controlled environmental conditions to ensure that the equipment operates at maximum efficiency. The described processes and techniques utilize a rapidly deployable and extensible sensor network that can track and/or control a variety of environmental conditions. Examples of environmental conditions include temperature, humidity, air flow, power usage, and so on. Environmental sensors can be attached to data facility devices and/or placed throughout the data facility structure to monitor the environmental condition of specific devices and/or the ambient conditions of part or all of the data facility. For purposes of illustration, a data center implementation of a data facility is utilized for the following discussion.

Illustrative Environment

Figure 1:
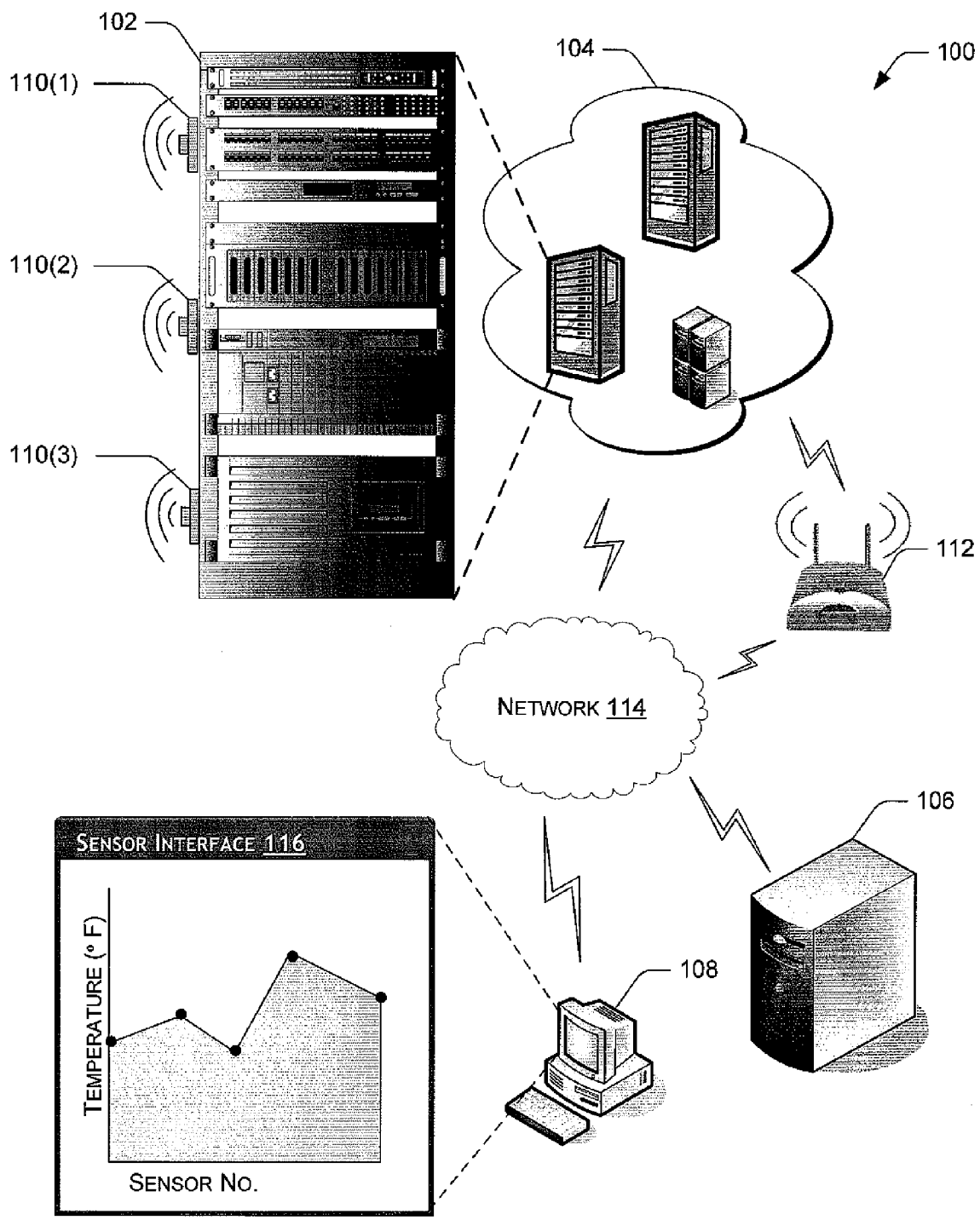
FIG. 1 illustrates one example of an environment that can implement environmental monitoring and control processes.

FIG. 1 illustrates at 100 one example of an environment that can utilize the disclosed techniques and processes. Environment 100 is presented for purposes of example only, and the disclosed techniques and processes are broadly applicable to other environments.

Environment 100 includes a cabinet 102 (also known as a rack) and a sensor network 104. Cabinet 102 includes various types of data handling equipment, such as servers, hard drives and other forms of data storage devices, UPSs (uninterruptible power supplies), routers, switches, and any other suitable type of data storage and/or handling devices. Sensor network 104 includes a variety of devices such as rackmount cabinets (e.g., cabinet 102), standalone devices such as servers, desktops, and mainframes, and/or any other suitable data handling devices. Sensor network 104 also includes system information servers that store data center configuration and operational data that can be accessed over the network. This data includes, but is not limited to, rack configuration (e.g. what devices are mounted in each rack), device power consumption, device workload, etc. Some devices in sensor network 104 may have sensors attached thereto, while other devices may not. Sensor network 104 is representative of a wireless network, a wired network, or a combination thereof and can include, but is not limited to, a variety of sensors (wireless, wired, or a combination thereof), such as temperature sensors, humidity sensors, air flow sensors, power consumption sensors, and so on. Other suitable environments may include different arrangements and types of data handling equipment, such as stand-alone servers, laptop computers, and so on.

Also included in environment 100 is a sensor server 106. Sensor server 106 is configured to collect sensor data from a variety of sensors and sensor networks (e.g., sensor network 104), process the data, produce environmental images based on the data, manipulate environmental conditions based on the sensor data and/or environmental images, and/or make the sensor data and environmental images available for viewing. Sensor server 106 may be implemented in many ways including, for example, as a standalone general purpose computing device or mainframe, or as a cluster of servers (e.g., arranged in a server farm). Sensor server 106 can also run a database, such as a SQL server. The sensor server can communicate with other data center systems in addition to the sensor network, such as HVAC systems, power systems, inventory systems, and so on. A client computer 108 enables a data center administrator or other authorized user to interact with the sensors and sensor networks and to manipulate data center environmental conditions. Client computer 108 may be implemented in any number of ways including, for example, as a general purpose computing device (e.g., desktops), a laptop, a mobile computing device, a PDA, a communication device, and so on.

Sensors 110(1), 110(2), and 110(3) are attached to cabinet 102 and communicate with a sensor basestation 112. Sensors 110(1), 110(2), and 110(3) can include any type of sensor (wireless, wired, or a combination thereof), such as a temperature sensor, a humidity sensor, an air flow sensor, a power usage sensor, and so on. Illustrative sensors include a microcontroller, a memory, a communication component (wired and/or wireless), and a sensing component that is configured to detect one or more environmental conditions.

Sensor basestation 112 can include any device suitable for transmitting data to sensors, receiving data from sensors, and routing data to appropriate locations. Examples of a suitable sensor basestation include a wired router, a wireless router, a network switch, and so on. Sensor basestation 112 is also in communication with the sensors in sensor network 104. Sensor basestation 112 can communicate with sensor server 106 and client computer 108 via a network 114. In other examples, sensor server 106 and/or client computer 108 may be in direct communication with sensor basestation 112 and thus do not require network 114. Network 114 is representative of a wireless network, a wired network, or a combination thereof, and can include, but is not limited to, a Local Area Network (LAN), a Wide Area Network (WAN), and a Metropolitan Area Network (MAN).

In an illustrative operation, sensor server 106 periodically queries sensor basestation 112 for sensor data. When sensor server 106 submits a sensor data query to sensor basestation 112, the sensor basestation signals the appropriate sensors (which may be one, several, or all of the sensors in a sensor network) and requests sensor readings from the sensors. The appropriate sensors (e.g., one or all of sensors 110(1), 110(2), and 110(3)) return sensor data packets that include sensor readings and any other required data (e.g., a sensor identifier, sample time, sensor location) to the sensor basestation, which then forwards the sensor data packets to sensor server 106. Alternatively, the sensors can periodically send sensor data to the sensor basestation without receiving a query. Sensor server 106 processes the sensor data packets to produce an environmental image that characterizes the environmental conditions of the data center. One example of an environmental image is a temperature profile that includes temperature readings for a specific piece of data center equipment and/or a variety of data center equipment and/or locations. Other environmental images include humidity profiles, power consumption profiles, lighting profiles (e.g., in lumens) and/or any other environmental condition of interest. An environmental image may be based on archived sensor readings and/or may be constructed using real-time sensor readings.

A data center administrator or other user requests data center environmental information using client computer 108. Client computer 108 displays one or more environmental images to the user via a sensor interface 116. In this example, sensor interface 116 displays a temperature profile created using sensor data from multiple temperature sensors. The temperature profile indicates several temperature readings and the specific sensors from which each temperature reading was taken. In real-time scenarios, sensor interface 116 is dynamic and the environmental image displayed by the interface can change in real-time if environmental conditions change. Thus, the sensor interface can give a user a real-time view of data center environmental conditions. In some implementations, sensor interface 116 can be displayed as a web page. The web page can be viewed by users with the appropriate authorization, and such users can view and interact with the sensor system using the web page.

Sensor Placement

Figure 2:
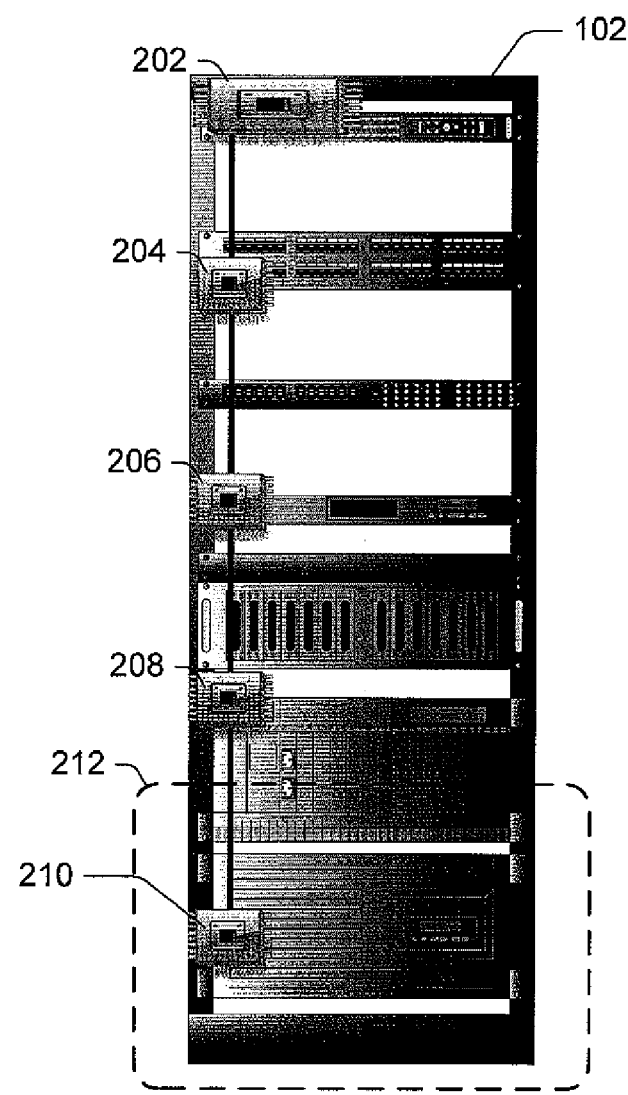
FIG. 2 illustrates one example of a master sensor and slave sensors that can monitor environmental conditions in a data facility.

FIG. 2 shows at 200 an example of sensor placement on cabinet 102. In this example, cabinet 102 is shown in a front view. The sensors on cabinet 102 include a master sensor 202 and slave sensors 204, 206, 208 and 210. These sensors are placed on varying positions on cabinet 102 to permit a variety of environmental conditions to be measured. The sensors can be battery powered and/or connected to a power source, such as a USB (universal serial bus) port associated with cabinet 102 or a power-over-Ethernet network port. Slave sensor 204 is placed higher on the cabinet and thus would provide environmental information for an area higher than would slave sensor 210. In this example, the sensors are connected in-line by a bus strip or other electrically conductive connector and can communication with each other via the connector Master sensor 202 handles data requests from sensor basestation 112. Thus, when sensor server 106 submits a query for specific environmental conditions, sensor basestation 112 forwards the request to the appropriate master sensor and/or sensors. In one example, sensor server 106 submits a query to sensor basestation 112 for temperature data for a region 212 of cabinet 102. In this example, slave sensor 210 is the closest sensor to region 212. To retrieve temperature data from slave sensor 210, sensor basestation 112 submits a temperature data request to master sensor 202. Master sensor 202 queries slave sensor 210 for a temperature reading, and slave sensor 210 takes a temperature reading and returns the reading to master sensor 202. The master sensor replies to the query from sensor server 106 with a data packet that includes the temperature reading from slave sensor 210. A master sensor can submit queries to one, several, or all of the slave sensors with which the master sensor communicates.

In other examples, the sensors need not be attached to data center equipment, but can be placed in strategic locations throughout the facility. For example, sensors may be placed on and/or suspended from the ceilings, floors, walls, or any other suitable area of a data center. The sensors may also be stand-alone sensors that are not configured in the master/slave scenario discussed above. In some implementations, the sensors may be placed directly on and/or within data center equipment (e.g., attached to a motherboard) to achieve environmental readings for a specific piece of equipment. Some sensor networks and/or sensor systems may include any or all of the above sensor configurations, as well as combinations thereof.

Illustrative System

Figure 3:
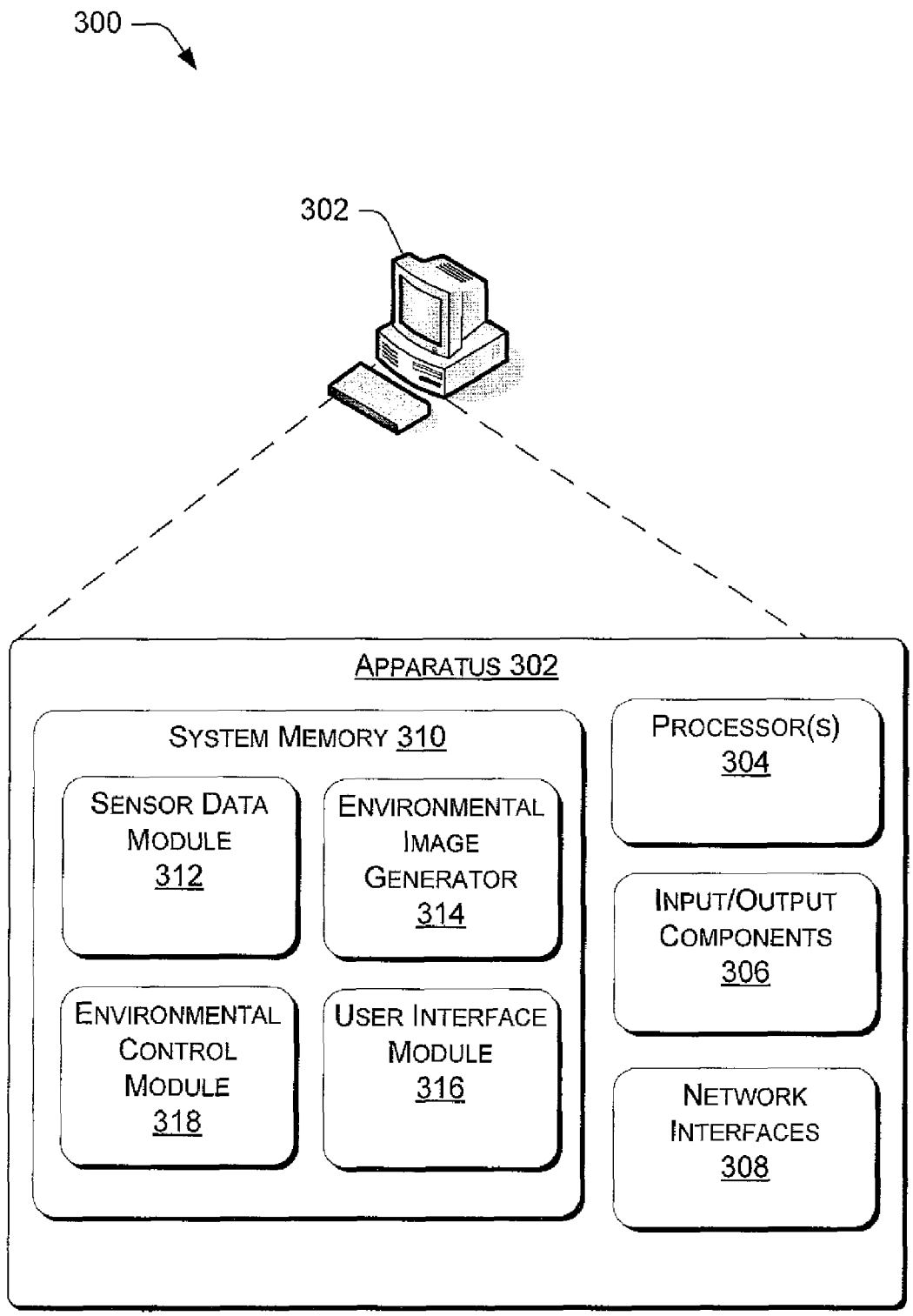
FIG. 3 illustrates one example of a system for monitoring and controlling data facility environmental conditions.

FIG. 3 illustrates a system 300 that can implement the disclosed processes and techniques. System 300 is presented for purposes of example only, and the described processes and techniques are broadly applicable to a variety of systems.

System 300 includes an apparatus 302. Although apparatus 302 is illustrated here as a desktop PC (a general purpose computing device), any suitable apparatus may be employed, such as a server device, a laptop, a mobile computing device, a PDA, and so on. Examples of apparatus 302 include sensor server 106 and/or client computer 108. Apparatus 302 includes processor(s) 304, input/output (I/O) components 306, network interfaces 308, and a system memory 310. Processor(s) 304 may be one or more microprocessors, microcomputers, nicrocontrollers, dual core processors, and so forth. I/O components 306 provide data I/O capabilities for system 300 and may include any number of components, such as a disk drive, a scanner port, a mouse port, a keyboard port, and so forth. Network interfaces 308 provide connectivity to a wide variety of networks and protocol types, including wire networks (e.g., LAN, cable, etc.) and wireless networks (e.g., WLAN, cellular, satellite, etc.).

System memory 310 includes, for example, volatile random access memory (e.g., RAM), non-volatile read-only memory (e.g., ROM, flash memory, etc.), hard disk drives, and so on. System memory 310 can store sensor data and pre-computed images which can be retrieved by appropriate software. System memory 310 is used to store one or more program modules, such as modules 312-318. Program modules 312-318 generally include routines, programs, objects, components, data structures, etc., that perform particular tasks or implement particular abstract data types. A sensor data module 312 is configured to generate queries for sensor data as well as receive sensor data. When a user requests sensor data, sensor data module 312 forwards the query to sensor basestation 112 (e.g., via network interfaces 308). When sensor data is accumulated in response to the user request, the data is returned via network interfaces 308 to sensor data module 312.

An environmental image generator module 314 processes the sensor data from sensor data module 312 to generate an environmental image. User interface module 316 configures the environmental image so that it can be displayed to a user. User interface module 316 also receives user input that generates sensor queries and/or that manipulates data center environmental conditions.

Environmental control module 318 serves as an interface with data center environmental controls. A user can manipulate a variety of environmental controls via apparatus 302. Examples of environmental controls include HVAC (heating, ventilation and air conditioning) systems, humidity controls (e.g., dehumidifiers and/or humidifiers), power conditioners (e.g., surge suppressors, UPSs, standby power supplies, power filters), voltage regulators, lighting controls, and so on. For example, if a particular environmental image indicates that a certain data center environmental condition is outside of optimal parameters (e.g., the temperature around a server rack A is too high), a user can interact with the environmental control module to change HVAC settings in the area around server rack A to attempt to bring the temperature in that area within acceptable limits.

In some implementations, the environmental control module can make automatic environmental adjustments based on predefined environmental limits. Thus, if an environmental image indicates that one or more environmental conditions are outside of optimal parameters, the environmental control module can communicate with the appropriate data center environmental controls to make the needed adjustments. In the example above, this can include automatically signaling the HVAC system to increase air flow and/or decrease the cooling temperature setting in the area around server rack A.

Illustrative Processes

Illustrative processes are described in this section with additional reference to FIGS. 1-3. The illustrative processes may be described in the general context of computer executable instructions and are illustrated as collections of blocks in logical flowcharts, which represent sequences of operations that can be implemented in hardware, software, or a combination thereof. Generally, computer executable instructions can include routines, programs, objects, components, data structures, procedures, modules, functions, and the like that perform particular functions or implement particular abstract data types. The processes may also be practiced in a distributed computing environment where functions are performed by remote processing devices that are linked through a communications network. In a distributed computing environment, computer executable instructions may be located in both local and remote computer storage media, including memory storage devices.

Figure 4:
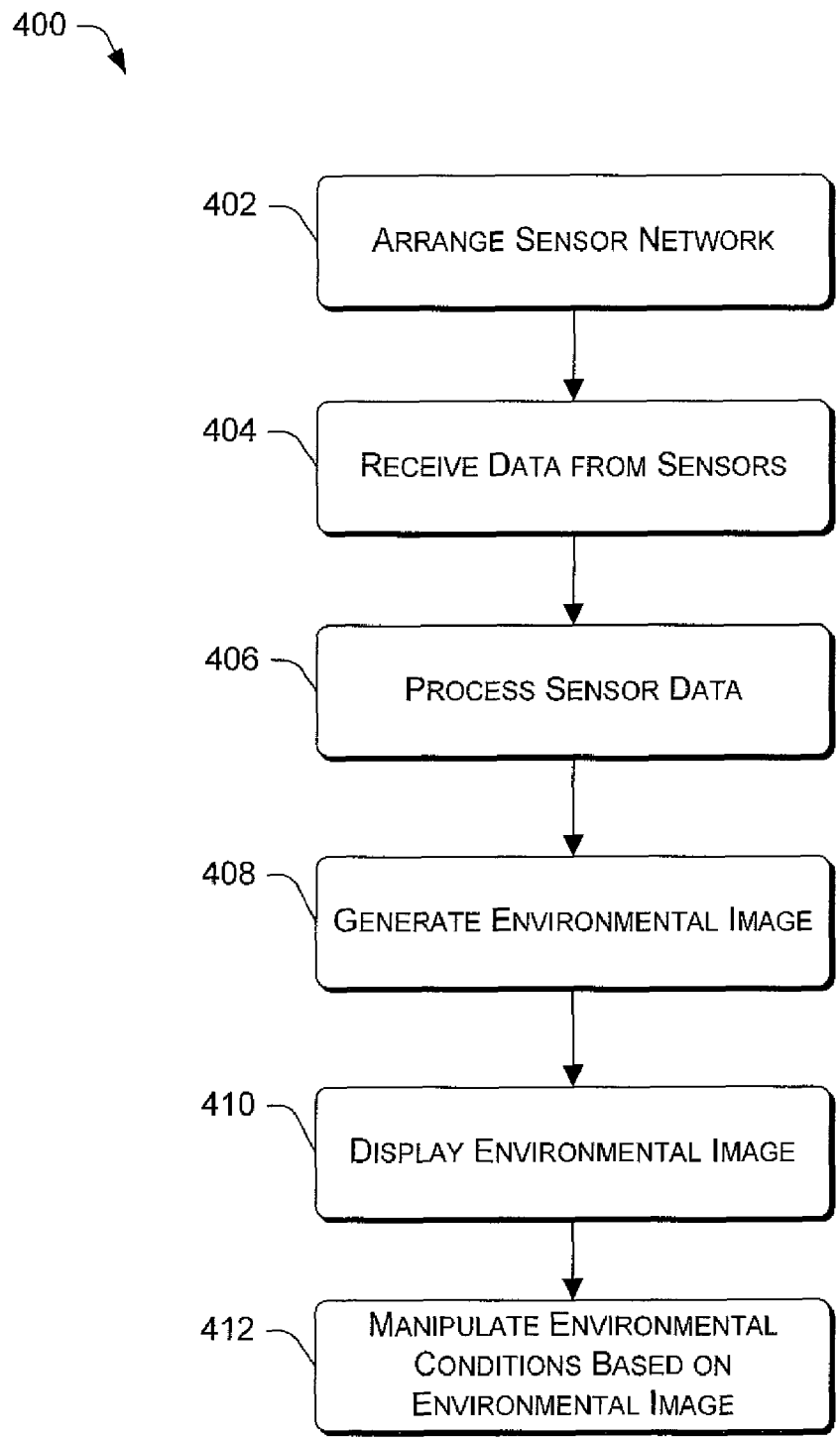
FIG. 4 is a flow diagram of a process for monitoring and controlling data facility environmental conditions.

FIG. 4 illustrates at 400 one example of a process for monitoring data center environmental conditions. At 402, a sensor network is arranged within a data center. At 404, sensor data is received from one or more of the sensors in the sensor network. The sensor data can be received in response to a user request for environmental data and/or as part of an automatic data center monitoring process. At 406, the sensor data is processed and at 408, the processed sensor data is used to generate an environmental image. The environmental image can include a profile of one or more data center environmental conditions. At 410, the environmental image is displayed to a user. In other implementations, the environmental image may not be displayed to a user. At 412, one or more environmental conditions are manipulated based on the environmental image. Manipulating environmental conditions can include interacting with environmental controls (e.g., an HVAC system) to bring environmental parameters within acceptable limits. Environmental conditions may also be manipulated by changing the data center configuration in terms of cabinet layout and workload distribution within the data center. Cabinet layout can be altered by changing cabinet locations in the data center.

Figure 5:
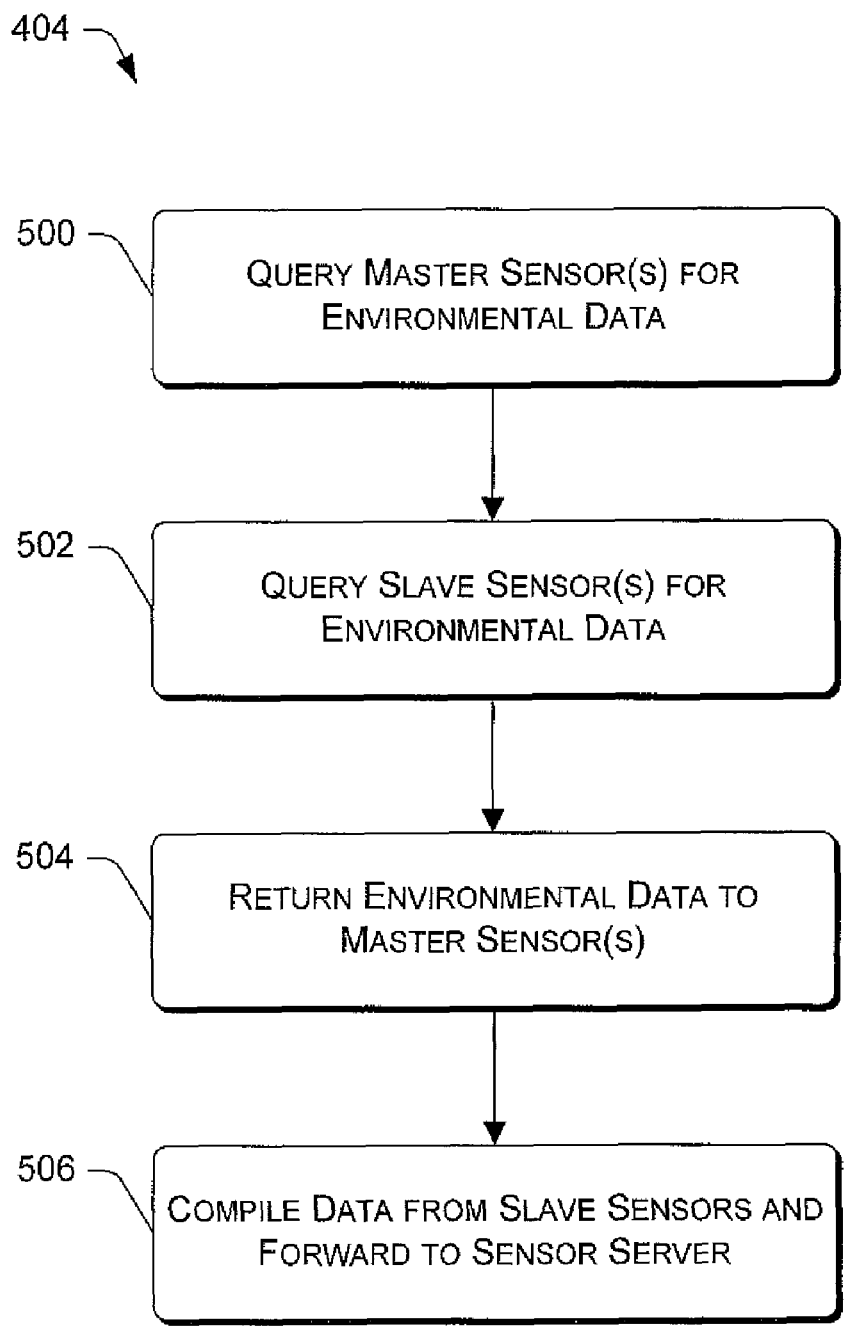
FIG. 5 is a flow diagram detailing certain aspects of a process for monitoring and controlling data facility environmental conditions.

FIG. 5 illustrates at 404 further aspects of act 404, according to one example. At 500, a master sensor is queried for environmental data. Act 500 can include forwarding a query from a sensor server to a sensor basestation, which then forwards the query to an appropriate master sensor. At 502, the master sensor determines the appropriate slave sensor(s) and queries the slave sensor(s) for the environmental data. In one example, the environmental data query asks for air flow readings at a certain data center location. A master sensor in the data center location determines the appropriate slave sensor(s) and queries the sensor(s) for air flow readings.

At 504, the slave sensor(s) return environmental data to the master sensor(s). The environmental data can include temperature readings, air flow readings, humidity readings, and so on. At 506, the master sensor(s) compiles the environmental data from the slave sensor(s) and forwards the environmental data to the sensor server via the sensor basestation.

Figure 6:
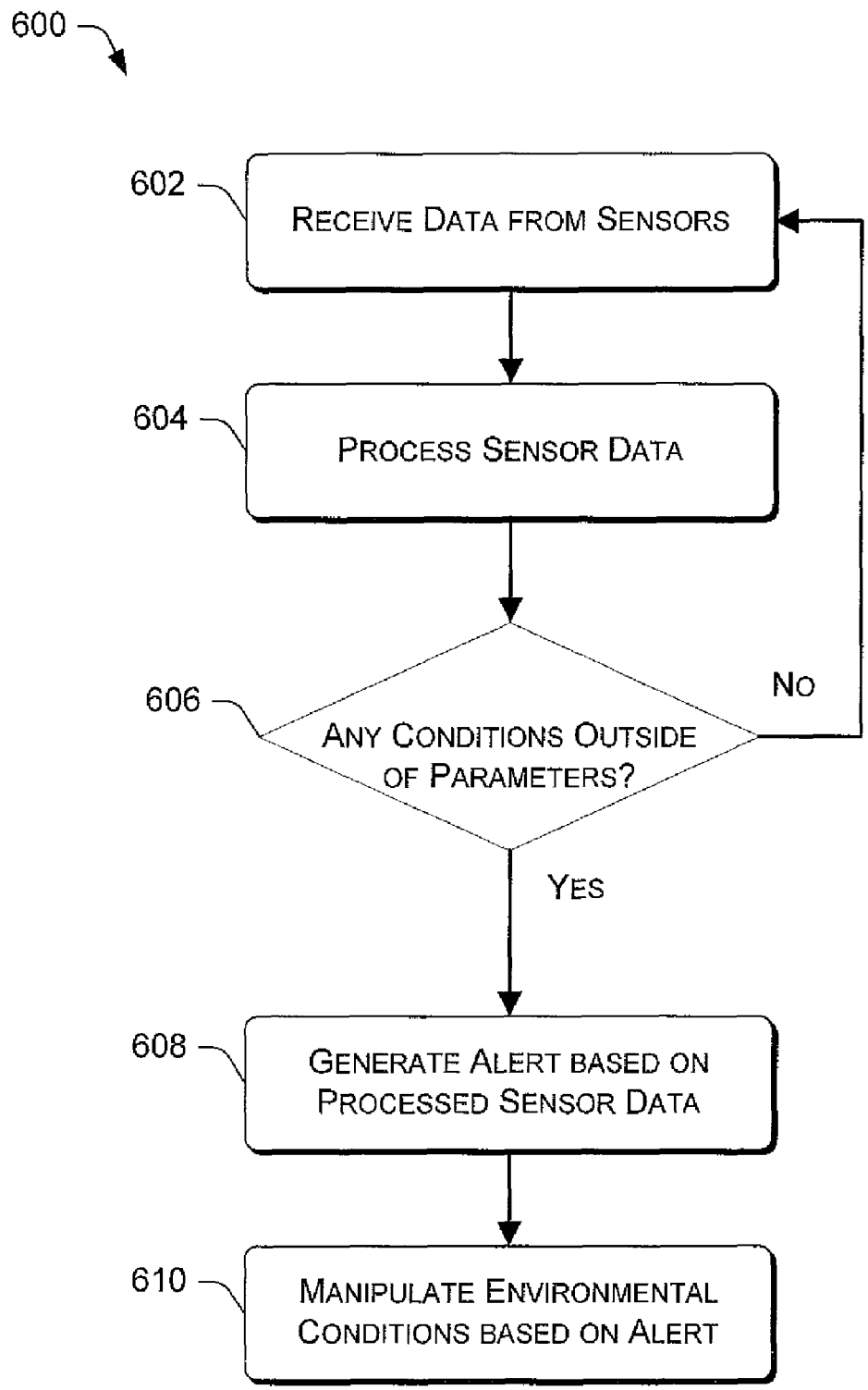
FIG. 6 is a flow diagram of a process for generating alerts based on environmental sensor data.

FIG. 6 illustrates at 600 a process for adjusting environmental conditions based on alerts generated by a sensor system. At 602, sensor data is received from one or more sensors in a sensor system. At 604, the sensor data is processed. At 606, it is determined if any environmental conditions are outside of acceptable parameters. If no environmental conditions are outside of acceptable parameters, the process returns to 602 and continues monitoring data center environmental conditions. If any data center environmental conditions are outside of acceptable parameters, at 608 an alert is generated based on the processed sensor data. In one example, the processed sensor data indicates that one or more data center environmental conditions (e.g., humidity levels) are outside of acceptable limits. Thus, an alert would be generated that identifies the environmental condition(s) that are outside of acceptable limits. At 610, one or more environmental conditions are adjusted and/or manipulated in response to the alert(s). The environmental conditions may be manipulated through user interaction with the sensor system (e.g., via a user interface). Alternatively and/or additionally, the environmental condition(s) can be manipulated automatically in response to the alert(s) (e.g., via environmental control module 318).

Sensor Data Table

FIG. 7 illustrates at 700 one example of a sensor data table 702 that can be implemented to collect and/or store sensor data. Sensor data table 702 can be stored in a memory such as system memory 310 and can be accessible to a sensor system via a software module such as sensor data module 312.

Sensor data table 702 includes a variety of sensor records, as shown by sensor records 704-712. Each of the sensor records tracks specific sensor data for a particular sensor and/or group of sensors. The sensor records can be arranged in particular patterns such that each sensor table represents a particular data center region or a particular grouping of data center resources (e.g., a rack or cabinet in a data center, or a group of racks or cabinets). For each sensor and/or group of sensors in the sensor data table, the table tracks a sensor identifier (ID), the sensor type, the sensor location, a sensor value, and a sample time at which the sensor value was collected. These types of data are not intended to be limiting, and other sensor data tables may track different types and/or arrangements of data.

At 704 is illustrated a sensor record with a sensor ID of 12345. The sensor ID may be any suitable method or protocol for identifying sensors, such as a media access control (MAC) address. In some implementations, each sensor in the sensor network has a unique ID. Sensor record 704 also indicates that the sensor associated with this record is a temperature sensor. Each sensor record indicates the sensor type in terms of the environmental condition(s) that the sensor is configured to monitor. Each sensor may be capable of monitoring one or multiple different environmental conditions. Sensor record 704 also indicates a sensor location. The location recorded here indicates a sensor location of row two, cabinet one, slot 40, front. This indicates a location with the data center and with respect to a specific cabinet location. The sensor value in sensor record 704 indicates an environmental condition that was detected by the sensor. In this example, the sensor associated with sensor record 704 is a temperature sensor and has recorded a temperature value of 99.3 degrees Fahrenheit. The sample time value of sensor record 704 records a time at which the sensor value in the sensor value column was recorded. In sensor record 704, the sample time is nine hours, twenty-two minutes, and seventeen seconds.

Sensor record 706 indicates a sensor ID of 54321 and a sensor type that measures one or both of temperature and humidity. The sensor location for sensor record 706 is row twelve, cabinet eight, slot three, front. The recorded sensor value is 46.3 percent, which indicates a humidity reading. The humidity reading was taken at thirteen hours, four minutes, and fifty-four seconds.

Sensor record 708 indicates a sensor ID of a324b3e5 and a sensor type that measures air flow. The sensor location is room 4, southeast corner. The recorded sensor value is 250 cubic feet per minute (CFM) and the sample time at which the sensor value was taken is fourteen hours, fifteen minutes, and one second.

Sensor record 710 indicates a sensor ID of 8h435i and a sensor type that measures power consumption. The sensor location is row three, cabinet four. The recorded sensor value is 11.4 kilowatts (kW), and the sensor value was recorded at eighteen hours, twenty-one minutes, and forty-one seconds. As further shown at sensor record 712, a sensor data table can contain any number and arrangement of sensor records.

Sensor data table 702 can be employed to track and arrange data center environmental information to enable users to maximize data center efficiency while reducing data center power consumption and maintenance costs. The data in data table 702 can be imported into analytical software to detect environmental trends within the data center. The data may also be viewed via an interface, such as sensor interface 116.

While various illustrative device and operating implementations have been described, the components, modules, and features of these implementations may be rearranged, modified, and/or may be omitted entirely, depending on the circumstances.

Also, it should be understood that certain acts in the methods need not be performed in the order described, may be rearranged, modified, and/or may be omitted entirely, depending on the circumstances.

Moreover, any of the acts described above with respect to any method may be implemented by a processor or other computing device based on instructions stored on one or more computer-readable media. Computer-readable media can be any available media that can be accessed locally or remotely by the resource modeling application. By way of example, and not limitation, computer-readable media may comprise volatile and nonvolatile, removable and non-removable media implemented in any method or technology for storage of information such as computer-readable instructions, data structures, program modules or other data. Computer-readable media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the resource modeling application. Combinations of the any of the above should also be included within the scope of computer-readable media.

CONCLUSION

Although the invention has been described in language specific to structural features and/or methodological acts, it is to be understood that the invention is not necessarily limited to the specific features or acts described. Rather, the specific features and acts are disclosed as illustrative forms of implementing the invention.

What is claimed is:

1. A method, comprising:
receiving environmental data from a sensor network comprising a master sensor and a plurality of slave sensors via a sensor basestation, the sensor network configured to monitor one or more environmental conditions associated with a data facility, wherein after the sensor basestation submits a query to the master sensor, the master sensor submits a data packet to the sensor basestation for the plurality of slave sensors;

tracking the environmental data in the form of a sensor data table arranged in particular patterns, the sensor data table comprising a sensor identifier, a sensor type, a sensor location, a sensor value and a sample time at which the sensor value was collected;

processing the environmental data to produce an environmental image of at least part of the data facility;

making the environmental image available for viewing; and communicating automatic environmental adjustments to a plurality of equipment in the data facility based on predefined environmental limits and the environmental image.

2. A method as recited in claim 1, wherein at least one of the sensors comprises a wireless sensor.

3. A method as recited in claim 1, wherein the plurality of slave sensors comprises at least one of a temperature sensor, a humidity sensor, a power usage sensor, and an air flow sensor.

4. A method as recited in claim 1, wherein the sensor network further comprises a sensor server to process the environmental data.

5. A method as recited in claim 1, wherein the environmental image comprises at least one of a temperature profile, a humidity profile, a power usage profile, or an air flow profile.

6. A method as recited in claim 1, further comprising displaying the environmental image on a sensor interface.

7. A method as recited in claim 1, further comprising manipulating one or more of the environmental conditions based on the environmental image.

8. A method as recited in claim 1, further comprising:
generating an alert based on at least one of the environmental conditions; and
manipulating one or more of the environmental conditions based on the alert.

9. A system, comprising:
a sensor network comprising a basestation, a master sensor and a plurality of slave sensors, wherein each of the master sensor and the plurality of slave sensors are configured to monitor one or more environmental conditions of a data facility, wherein the sensor basestation is configured to submit a query to the master sensor and the master sensor is configured to submit a data packet to the sensor basestation for the plurality of slave sensors;
a sensor server to receive environmental data from the sensor network and to process the environmental data to produce an environmental image of the data facility, the sensor server further configured to track the environmental data in the form of a sensor data table arranged in particular patterns, the sensor data table comprising a sensor identifier, a sensor type, a sensor location, a sensor value and a sample time at which the sensor value was collected;
a sensor interface to display the environmental image to a user; and
an environmental control module configured to communicate automatic environmental adjustments to a plurality of equipment in the data facility based on predefined environmental limits and the environmental image.

10. A system as recited in claim 9, wherein at least one of the plurality of slave sensors comprises a wireless sensor.

11. A system as recited in claim 9, wherein the environmental image comprises a real-time view of environmental conditions.

12. A system as recited in claim 9, wherein the sensor interface is configured to receive user input, and based on the user input, manipulate one or more of the environmental conditions.

13. A system as recited in claim 9, wherein the sensor interface comprises a web page.

14. A system as recited in claim 9, wherein the sensor server is configured to generate an alert based on the environmental data.

15. A system as recited in claim 14, wherein the sensor server is configured to manipulate one or more of the environmental conditions based on the alert.

16. One or more computer-readable media storing computer executable instructions that, when executed, cause one or more processors to perform acts comprising:
receiving environmental data from a sensor network comprising a master sensor and a plurality of slave sensors via a sensor basestation, the sensor network configured to monitor one or more environmental conditions associated with a data facility,
wherein after the sensor basestation submits a query to the master sensor, the master sensor submits a data packet to the sensor basestation for the plurality of slave sensors;
tracking the environmental data in the form of a sensor data table arranged in particular patterns, the sensor data table comprising a sensor identifier, a sensor type, a sensor location, a sensor value and a sample time at which the sensor value was collected;
processing the environmental data to produce an environmental image of at least part of the data facility;
making the environmental image available for viewing; and
communicating automatic environmental adjustments to a plurality of equipment in the data facility based on predefined environmental limits and the environmental image.

* * * * *